US011872690B2

(12) United States Patent
Chen (10) Patent No.: US 11,872,690 B2
(45) Date of Patent: Jan. 16, 2024

(54) PRECISION CLAMPING ASSEMBLY (71) Applicant: GLTTEK CO., LTD, Hsinchu (TW)

(72) Inventor: Chiung Nan Chen, Hsinchu (TW)

(73) Assignee: GLTTEK CO., LTD., Hsinchu (TW)

( * ) Notice: Subject to any disclaimer, the term of this patent is extended or adjusted under 35 U.S.C. 154(b) by 470 days.

(21) Appl. No.: 17/140,442

(22) Filed: Jan. 4, 2021

(65) Prior Publication Data
US 2022/0212350 A1 Jul. 7, 2022

(51) Int. Cl.
| | |
|---|---|
| *B25J 15/00* | (2006.01) |
| *B25J 19/02* | (2006.01) |
| *B25J 15/02* | (2006.01) |
| B25B 5/16 | (2006.01) |
| B25B 5/04 | (2006.01) |

(52) U.S. Cl.
CPC ....... *B25J 15/0042* (2013.01); *B25J 15/0206* (2013.01); *B25J 19/021* (2013.01); *B25B 5/04* (2013.01); *B25B 5/163* (2013.01)

(58) Field of Classification Search
CPC .. B25J 15/0042; B25J 15/0206; B25J 19/021; B25J 19/023; B25B 5/04; B25B 5/163; B25B 5/16; B25B 5/0253
See application file for complete search history.

(56) References Cited

U.S. PATENT DOCUMENTS

| | | | | |
|---|---|---|---|---|
| 3,630,391 | A * | 12/1971 | Wilson ................. | B25J 15/0226 408/69 |
| 5,853,211 | A * | 12/1998 | Sawdon ............... | B25J 15/0226 294/203 |
| 6,257,636 | B1 * | 7/2001 | Hovis ....................... | B66C 1/66 294/82.32 |
| 7,966,094 | B2 * | 6/2011 | Ban ........................ | B25J 9/1697 700/223 |
| 8,303,007 | B2 * | 11/2012 | Fukano ................ | B25J 15/0273 269/240 |
| 10,568,250 | B2 * | 2/2020 | Watanabe .......... | H05K 13/0408 |
| 2002/0093211 | A1 * | 7/2002 | Filipiak .................. | B25B 5/087 294/203 |

* cited by examiner

*Primary Examiner* — Stephen A Vu
(74) *Attorney, Agent, or Firm* — Thomas | Horstemeyer, LLP (57) ABSTRACT

A precision clamping assembly has a body, two clamping arms, and a drive device. The body has a first direction, a second direction, a chamber formed in the body, and an opening formed through an outer side of the body along the second direction and communicating with the chamber. The clamping arms are pivotally and movably connected to the body, and each clamping arm is disposed in the chamber and has a pivot end and a clamping end extended out of the body via the opening. The clamping ends are selectively moved toward or away from each other along the second direction and selectively moved same or opposite from each other along a third direction. The drive device is connected to the body and the two clamping arms, and has two driving sets disposed in the body and respectively connected to the two clamping arms.

20 Claims, 8 Drawing Sheets

PRECISION CLAMPING ASSEMBLY

BACKGROUND OF THE INVENTION

Field of the Invention

The present invention relates to a clamping assembly, and more particularly to a precision clamping assembly with a simple structure, which can provide a multi-directional clamping effect, and can accurately monitor the state of a clamped object.

Description of Related Art

Conventional clamping assemblies, such as tweezers, clamps, or robotic arms, can mostly provide a clamping effect for objects. Among them, the tweezers or clamps are mainly composed of two clamping arms connected with each other. The two clamping arms can be moved toward or away from each other to clamp an object by an external force. However, the tweezers or clamps can only use the two clamping arms moved toward or away from each other in a straight line to clamp the object in a single direction (one-dimension), and cannot provide a deflection or rotation (multi-direction/three-dimensions) effects for the clamped object.

For example, a conventional precision clamping mechanism has a gripper module and a sensing module. The gripper module has a fixed side claw and a movable side claw, which is driven by a stepping or servo motor to linearly control a distance between the fixed side claw and the movable side claw. Although the above-mentioned conventional precision clamping assembly can provide a precise clamping effect to the object, it can only provide a clamping effect in a single direction, which limits the applicability of the tweezers or clamps, and relatively limits the practicability of the tweezers or clamps. Although the robotic arms can provide a deflection or rotation effect to the clamped object, the robotic arms have a complicated structure, which will relatively increase the time and cost of use, assembly, and maintenance.

Furthermore, the conventional clamping assembly can move the clamped object between two relative positions. The state of the clamped object can be confirmed or monitored by positioning or image detection at the relative positions but it cannot accurately confirming the state of the clamped object during the clamping movement. The user cannot accurately confirm or monitor the actual state of the clamped object, especially if the clamped object is a wafer, a probe, an electronic part or a small component, and the clamped object may fall or swing easily during the clamping movement, which increases the difficulty and inconvenience of clamping, moving, and monitoring the clamped objects.

To overcome the shortcomings, the present invention tends to provide a precision clamping assembly to mitigate or obviate the aforementioned problem.

SUMMARY OF THE INVENTION

The main objective of the invention is to provide a precision clamping assembly with a simple structure, which can provide a multi-directional clamping effect, and can accurately monitor the state of a clamped object.

The precision clamping assembly in accordance with the present invention has a body, two clamping arms, and a drive device. The body has a first direction, a second direction, a chamber formed in the body, and an opening formed through an outer side of the body along the second direction and communicating with the chamber of the body. The two clamping arms are pivotally connected to the body, and each one of the two clamping arms is disposed in the chamber and has a pivot end pivotally disposed in the chamber and a clamping end extended out of the body via the opening. The clamping ends are selectively moved toward or away from each other along the second direction and selectively moved same or opposite from each other along a third direction. The drive device is connected to the body and the two clamping arms, and has two driving sets disposed in the body and respectively connected to the two clamping arms to and drive the two clamping arms to move along the second direction and the third direction.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 5, a precision clamping assembly in accordance with the present invention has a body 10, two clamping arms 20, a drive device 30, and a monitoring device 40.

The body 10 has a first direction D1, a second direction D2, a chamber 11, an opening 12, two through slots 13, and two pivot holes 14. The first direction D1 may be a lengthwise direction of the body 10, and the second direction D2 may be a widthwise direction of the body 10. The chamber 11 is formed in the body 10. The opening 12 is formed through an outer side of the body 10 along the second direction D2 and communicates with the chamber 11 of the body 10. The two through slots 13 are formed in the chamber 11 of the body 10 along the first direction D1 at a spaced interval, and each one of the two through slots 13 communicates with the opening 12. The two pivot holes 14 are formed in an inner wall of the body 10 at a spaced interval and away from the opening 12, and each one of the two pivot holes 14 communicates with one of the two through slots 13.

The two clamping arms 20 are pivotally and movably connected to the body 10, and each one of the two clamping arms 20 is disposed in the chamber 11 of the body 10 and has a pivot end 21 and a clamping end 22. Each pivot end 21 of the two clamping arms 20 is pivotally disposed in the chamber 11 of the body 10, and each clamping end 22 of the two clamping arms 20 extends out of the body 10 via the opening 12. Additionally, each one of the two clamping arms 20 is disposed in one of the two through slots 13 of the body 10, and is guided and limited by the corresponding through slot 13. Furthermore, each pivot end 21 of the two clamping arms 20 is connected to one of the two pivot holes 14 of the body 10, and the clamping arm 20 can pivot relative to the body 10.

The clamping ends 22 of the two clamping arms 20 can be moved toward or away from each other along the second direction D2, and can be moved same or opposite from each other along a third direction D3. The third direction D3 has two included angles respectively between the first direction D1 and the second direction D2 of the body 10. Preferably, each one of the two included angles is 90 degrees. In addition, a horizontal imaginary extension line H is defined between the clamping ends 22 of the two clamping arms 20 along the second direction D2.

The drive device 30 is connected to the body 10 and the two clamping arms 20, and has two driving sets 31. The two driving sets 31 are disposed in the body 10, are respectively connected to the two clamping arms 20, and each one of the two driving sets 31 has a first driving element 32 and a second driving element 33. The first driving element 32 is disposed in the chamber 11 of the body 10 along the first direction D1, and abuts against one of the two clamping arms 20 to enable the corresponding clamping arm 20 to move along the third direction D3. Each second driving element 33 of the two driving sets 31 is connected to one of the two clamping arms 20 to enable the corresponding clamping arm 20 to move along the second direction D2 of the body 10.

Furthermore, each one of the first driving elements 32 and the second driving elements 33 is a sheet or film made of a piezoelectric material, and the piezoelectric material may be the piezoelectric single crystal, the piezoelectric polycrystalline, the piezoelectric polymer or the piezoelectric composite material. A voltage generated by the drive device 30 after being energized enables each one of the first driving elements 32 and the second driving elements 33 to produce a mechanical deformation according to the piezoelectric effect, so that the corresponding clamping arm 20 moves along the second direction D2 and the third direction D3. Then the two clamping arms 20 are moved toward or away from each other along the second direction D2, and are deflected along the third direction D3. Preferably, each clamping end 22 of the two clamping arms 20 is metal tweezers, and the metal tweezers are combined one of the second driving elements 33. The two clamping arms 20 can clamp an object in a manner same as tweezers.

The monitoring device 40 is disposed on the body 10 and has an image capture module 41 disposed toward the clamping ends 22 of the two clamping arms 20 to detect or record an actual state of an object that is clamped between the two clamping ends 22 during a clamping movement.

Figure 1:
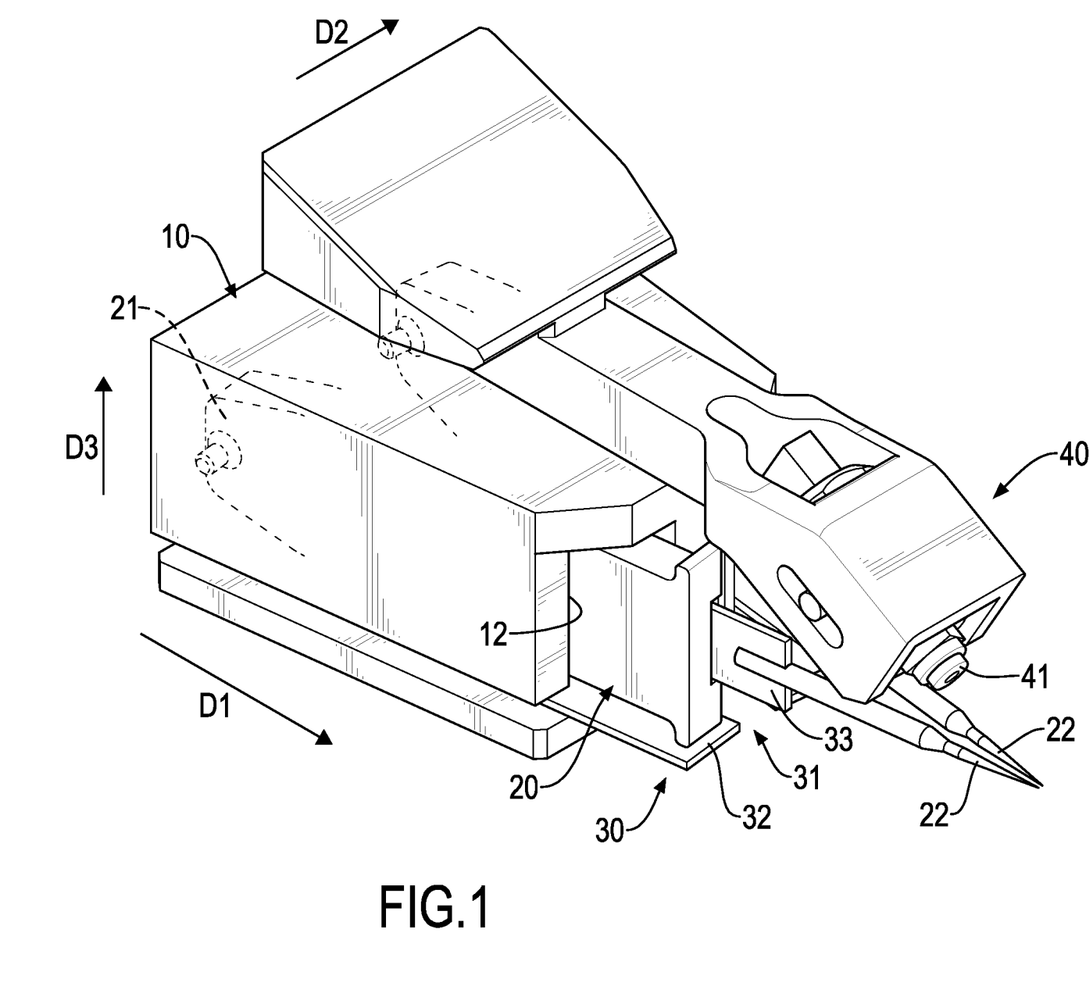
FIG. 1 is a perspective view of a precision clamping assembly in accordance with the present invention.
Figure 2:
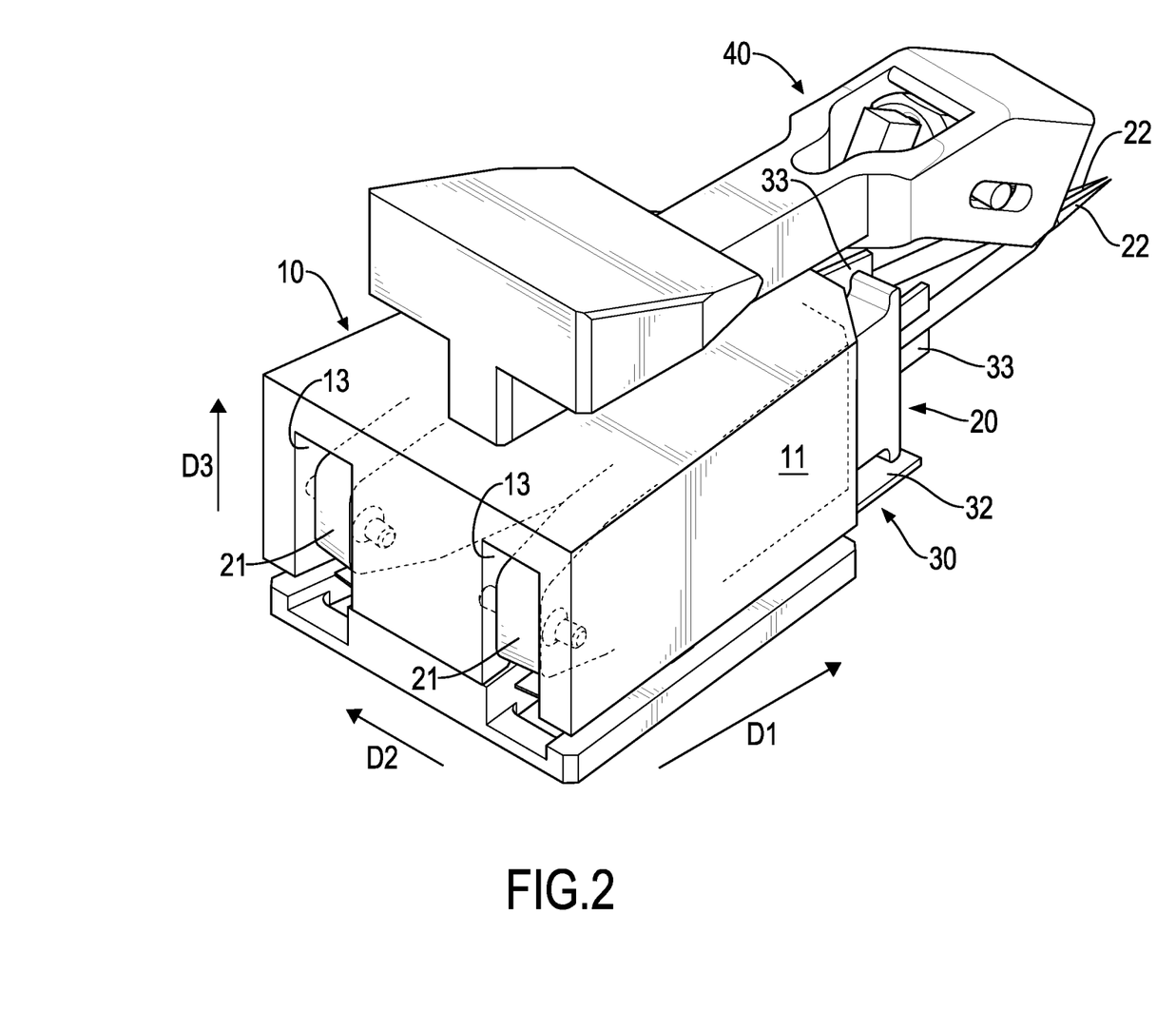
FIG. 2 is another perspective view of the precision clamping assembly in FIG. 1.
Figure 3:
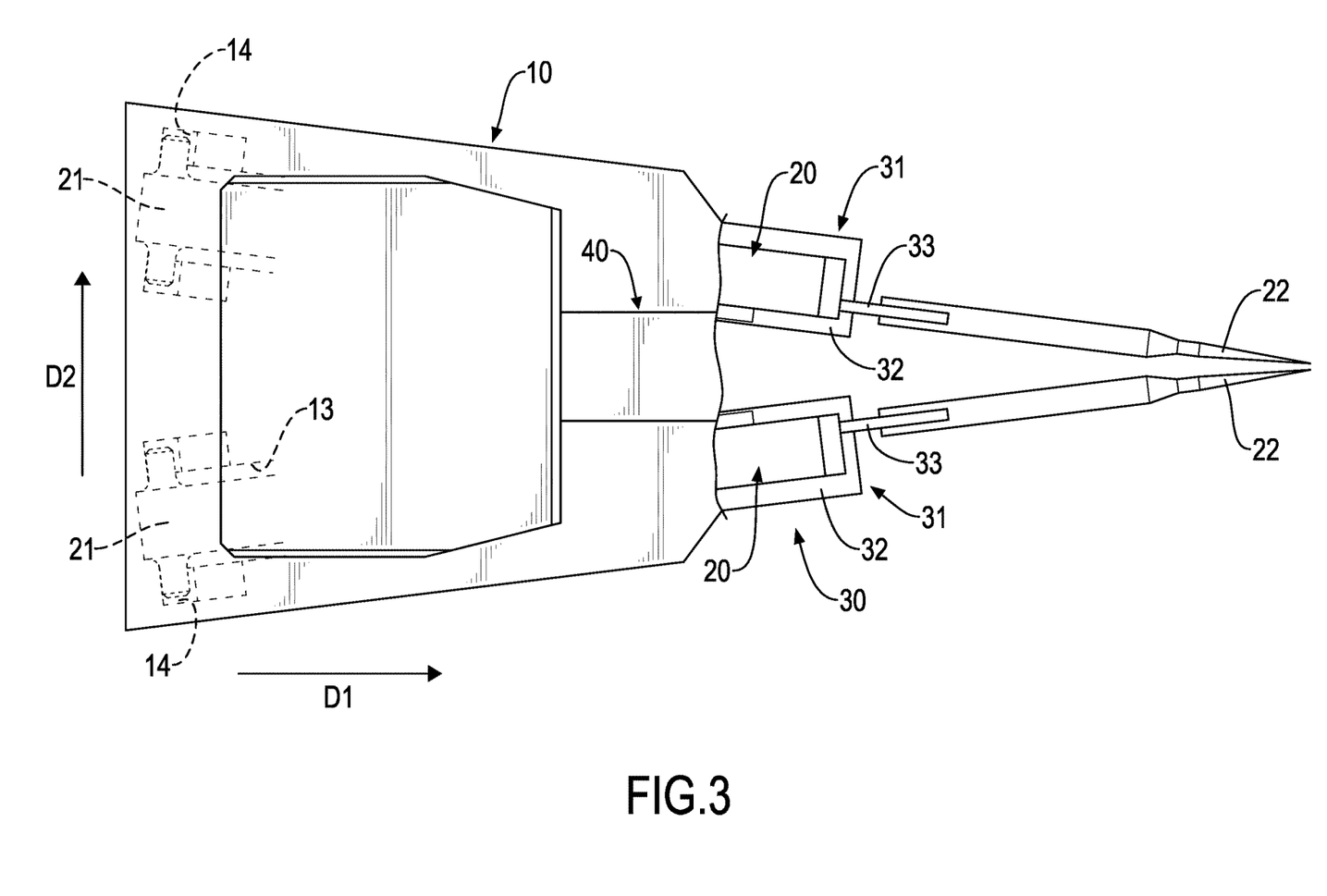
FIG. 3 is a top side view of the precision clamping assembly in FIG. 1.
Figure 4:
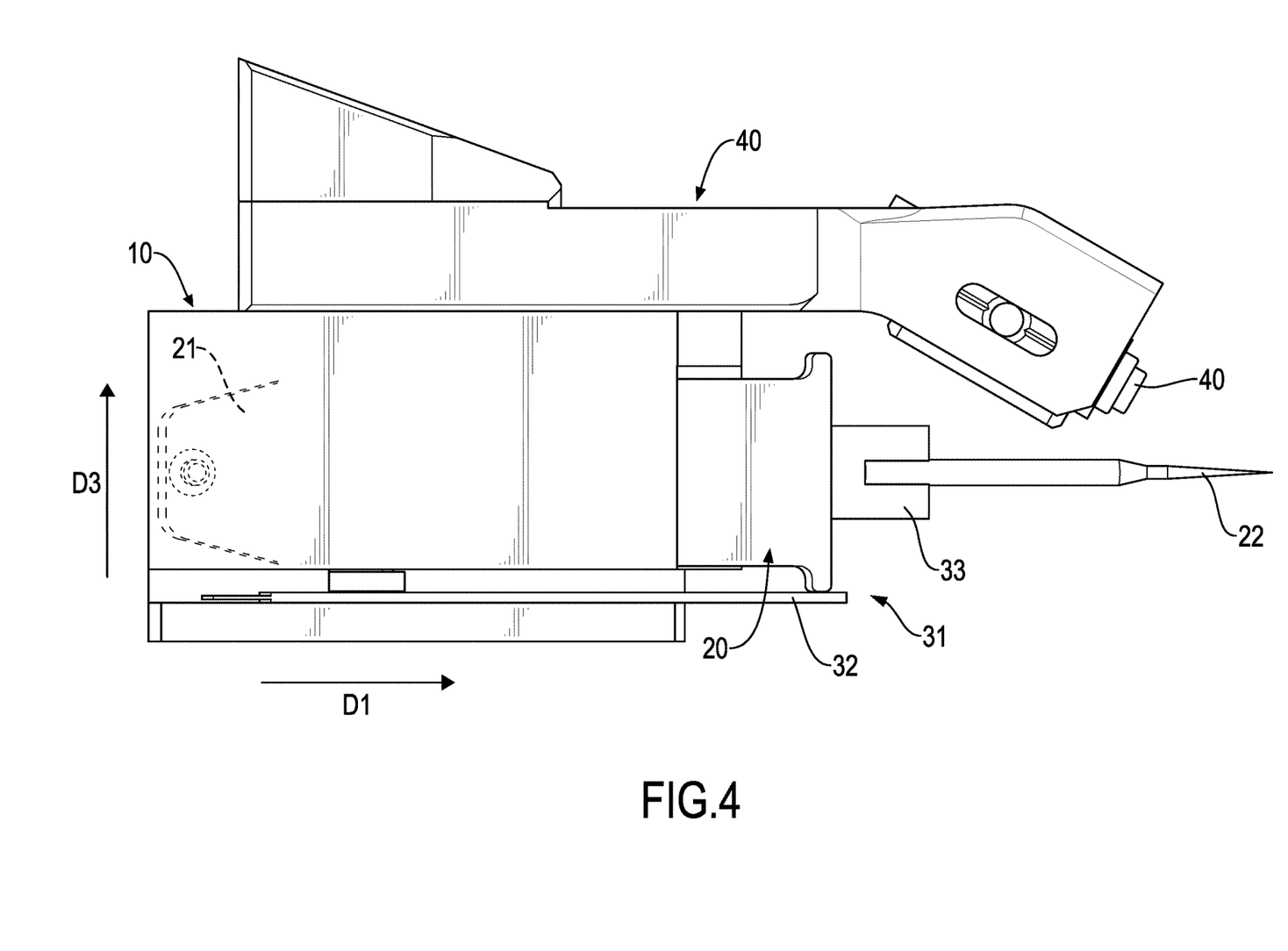
FIG. 4 is a side view of the precision clamping assembly in FIG. 1.
Figure 5:
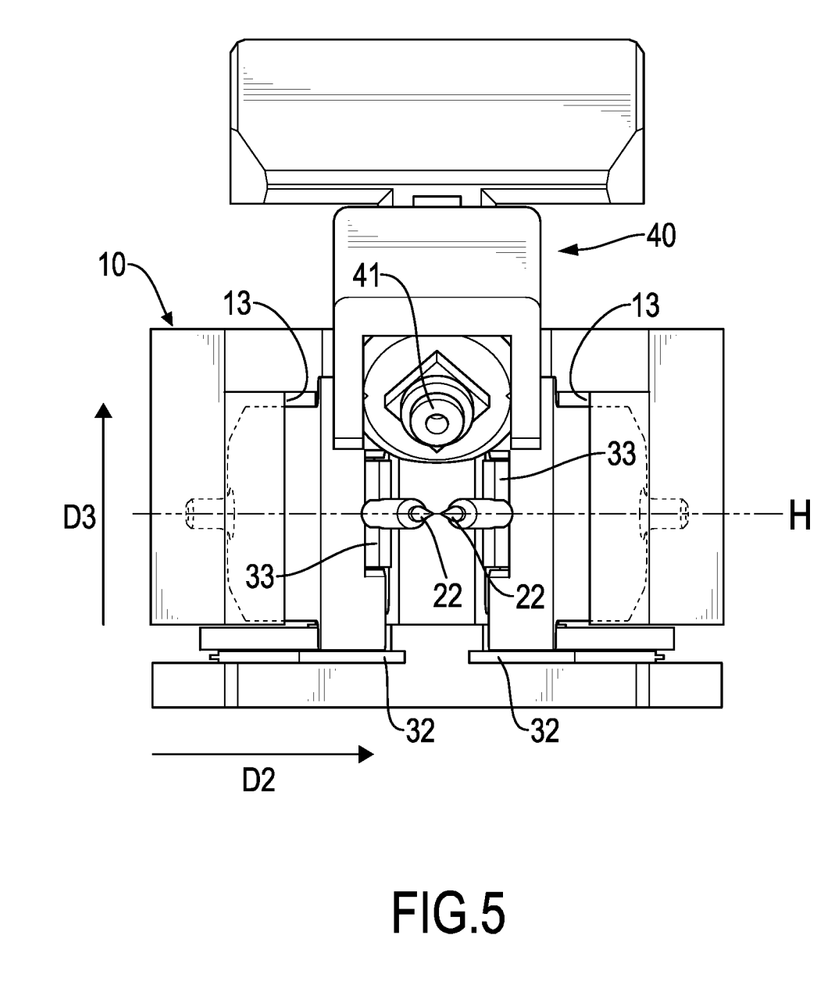
FIG. 5 is a front side view of the precision clamping assembly in FIG. 1.
Figure 6:
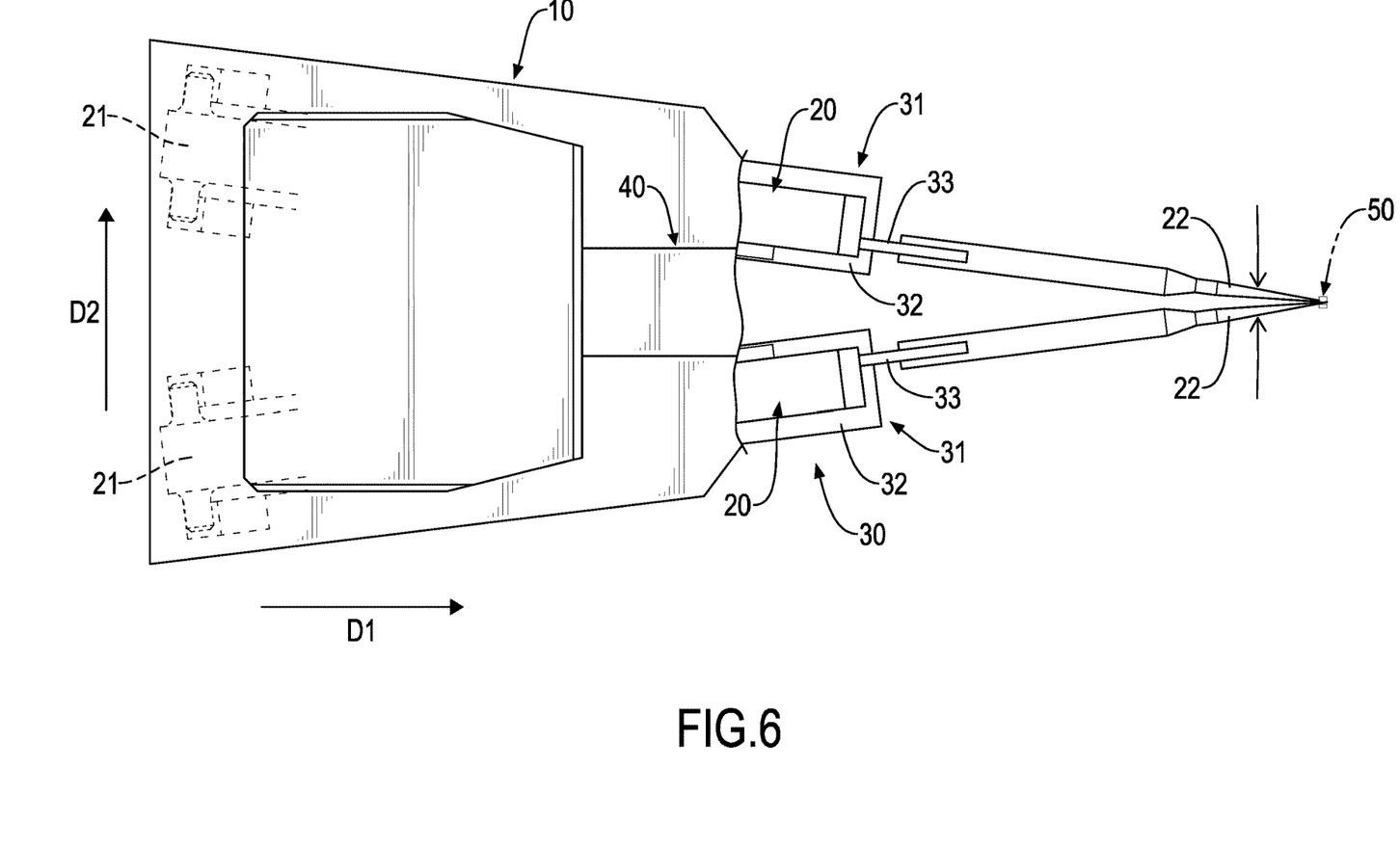
FIG. 6 is an operational top side view of the precision clamping assembly in FIG. 1.

As aforementioned, in use, with reference to FIG. 6 of the precision clamping assembly in accordance with the present invention, when the second driving elements 33 of the two driving sets 31 are energized, the two clamping ends 22 respectively connected to the two second driving elements 33 are moved toward each other along the second direction D2 of the body 10 to clamp an object. The above-mentioned operation mode can also drive only one of the second driving elements 33 so that the responsive one of the clamping ends 22 is moved toward the other clamping end 22. Therefore, the present invention is not limited to that the two second driving elements 33 or each one of them is energized at the same time, as long as the distance between the two clamping ends 22 along the second direction D2 can be changed to clamp the object. When the two clamping ends 22 clamp the object, in the subsequent movement process, the object held by the two clamping ends 22 can be detected and observed by the image capture module 41 of the monitoring device 40, and the actual state of the object in the movement process can be obtained accurately in real time. In addition, after clamping and moving of the object, the power to each one of the second driving elements 33 is released, the second driving elements 33 can be moved back to the original locations.

Figure 7:
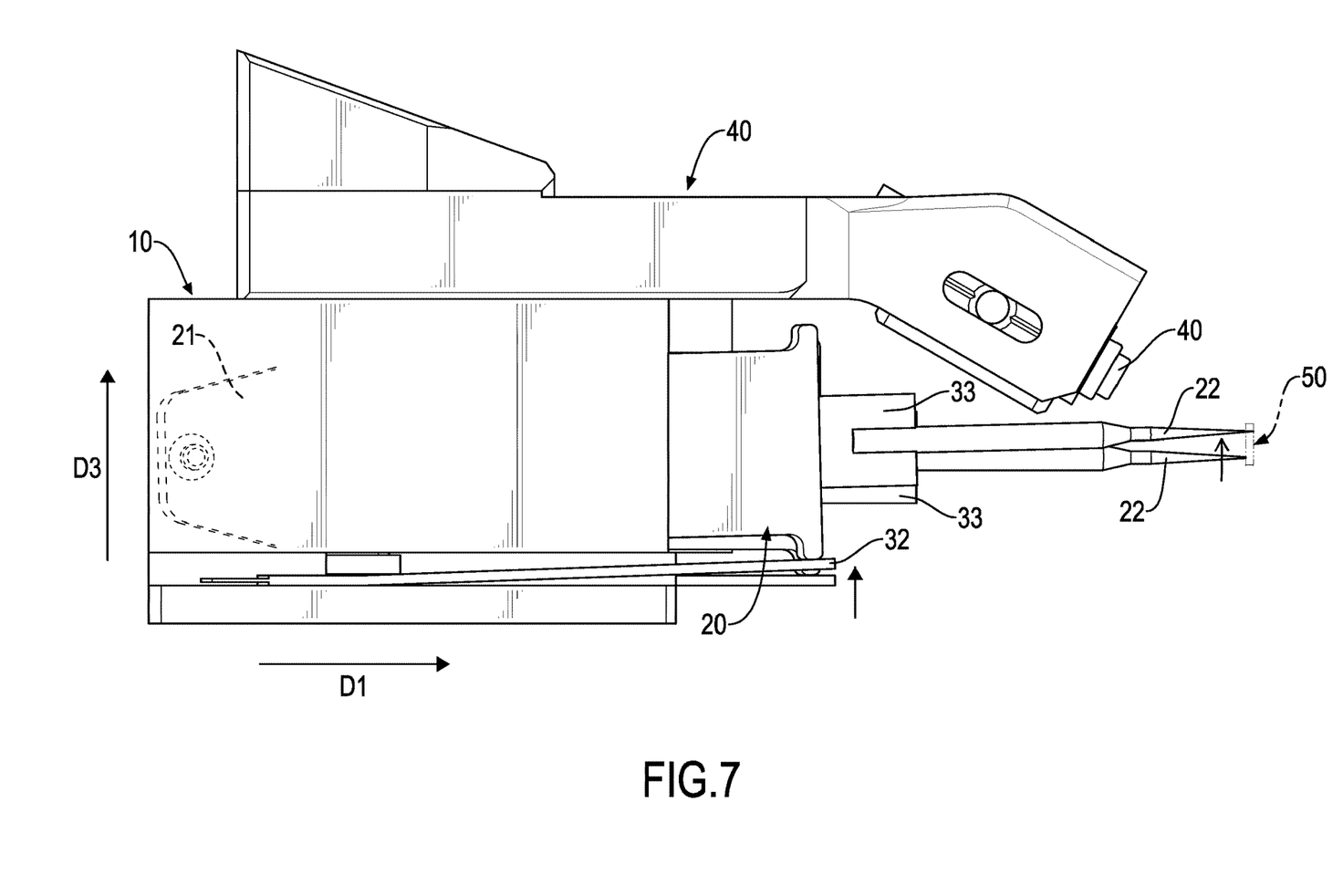
FIG. 7 is an operational side view of the precision clamping assembly in FIG. 1.
Figure 8:
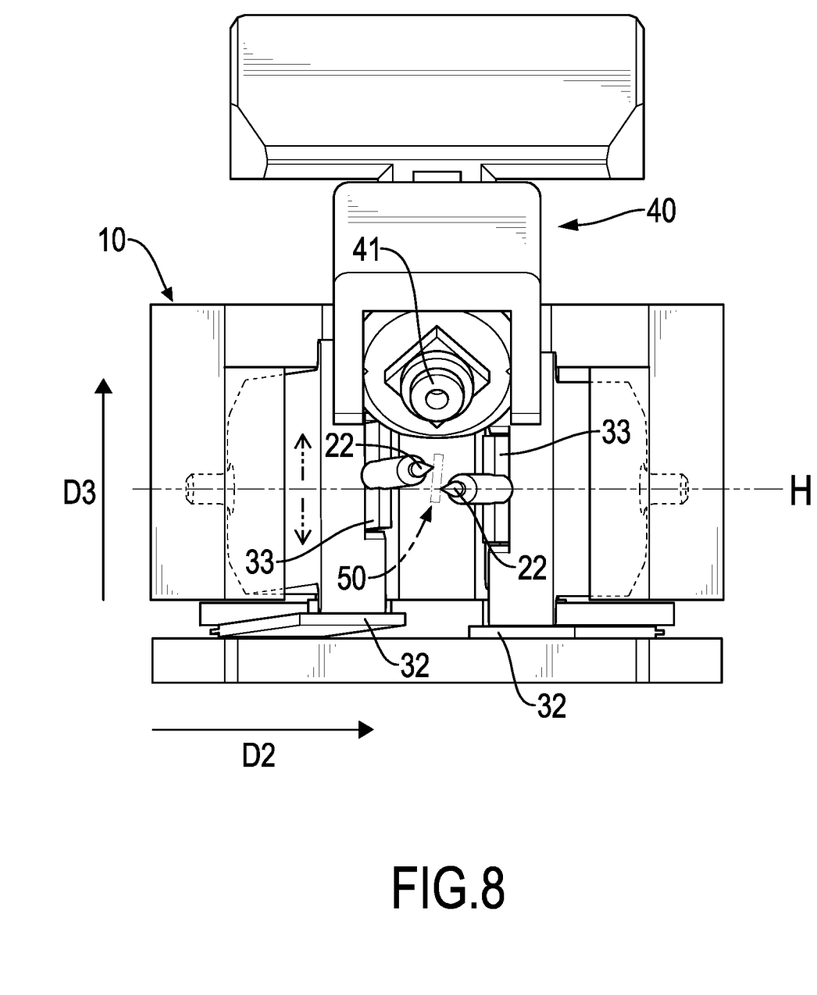
FIG. 8 is an operational front side view of the precision clamping assembly in FIG. 1.

With reference to FIGS. 7 and 8, when the clamping ends 22 of the two clamping arms 20 are moved by the two second driving elements 33 or by one of the two second driving elements 33 to clamp an object 50, one or two of the first driving elements 32 can be energized to enable one or two of the two clamping arms 20 to swing relative to the body 10 along the third direction D3 with the pivot ends 21 as a fulcrum. Then the object 50 clamped between the two clamping ends 22 of the clamping arms 20 is deflected or rotated between the two clamping ends 22 due to a relative displacement generated between the two clamping ends 22 along the third direction D3.

According to the above-mentioned features and structural relationships of the precision clamping assembly of the present invention, in use, the two clamping arms 20 are pivotally disposed in the body 10 and are driven by the drive device 30. Then the two clamping arms 20 can clamp the object 50 along the second direction D2 as shown in FIG. 6, and can deflect or rotate the object 50 due to the relative displacement between the two clamping ends 22 along the third direction D3 to produce multi-directional (three-dimensions) deflection or rotation effect (small size range) to the object 50 as shown in FIGS. 7 and 8. Furthermore, the body 10 can be connected to or assembled on other tools or drive devices, so that the body 10 can be moved or rotated along the first direction D1 through the transmission of the aforementioned components (large size range), which enables the precision clamping assembly of the present invention to provide a multi-directional clamping effect to the object 50. Compared with the conventional robotic arms, the precision clamping assembly of the present invention was created with fewer components and a simplified structure, so it can greatly reduce the time and cost for use, assembly, and maintenance.

In addition, the clamping ends 22 of the two clamping arms 20 of the precise clamping assembly of the present invention can clamp the object 50 at different angles according to the shape (regular/irregular) of the object 50 by the first driving elements 32 and the second driving elements 33 of the two driving sets 31 to greatly improve the applicability of the precision clamping assembly.

Furthermore, the first driving elements 32 and the second driving elements 33 of the precision clamping assembly of the present invention can be made of piezoelectric materials and can be energized to accurately control the movement or deflection of the clamping ends 22 of the two clamping arms 20. With reference to FIG. 8, each clamping end 22 of the two clamping arms 20 can move 0 to 600 micrometers (um) upward along the third direction D3 based on the horizontal imaginary extension line H, and can also move 0 to 400 micrometers (um) downward along the third direction D3 based on the horizontal imaginary extension line H. Consequently, the two clamping arms 20 of the precision clamping assembly of the present invention can clamp, deflect or rotate small objects 50 such as wafers, probes or electronic parts to provide a precise clamping effect.

Additionally, the monitoring device 40 disposed on the body 10 can captured images of the object 50 clamped between the clamping ends 22 by the image capture module 41 to detect and observe the actual state of the object 50 in real time during the movement process accurately and to effectively avoid the problem of the conventional clamping assembly.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A precision clamping assembly comprising:
    a body having
        a first direction;
        a second direction;
        a chamber formed in the body; and
        an opening formed through an outer side of the body along the second direction and communicating with the chamber of the body;
    two clamping arms pivotally connected to the body, and each one of the two clamping arms disposed in the chamber of the body and having
        a pivot end pivotally disposed in the chamber of the body; and
        a clamping end extended out of the body via the opening along the first direction, the clamping ends of the two clamping arms selectively moved toward or away from each other along the second direction and selectively moved same or opposite from each other along a third direction; and
    a drive device connected to the body and the two clamping arms, and having two driving sets disposed in the body, respectively connected to the two clamping arms and drive the two clamping arms, and each one of the two driving sets having two driving elements respectively to drive a corresponding clamping arm to move along the second direction and the third direction.

2. The precision clamping assembly as claimed in claim 1, wherein the precision clamping assembly has a monitoring device disposed on the body and having an image capture module disposed toward the clamping ends of the two clamping arms.

3. The precision clamping assembly as claimed in claim 2, wherein
    the two driving elements of each one of the two driving sets are respectively a first driving element and a second driving element;
    the first driving element is disposed in the chamber of the body along the first direction, and abuts against one of the two clamping arms to enable the corresponding clamping arm to move along the third direction; and
    the second driving element is connected to one of the two clamping arms to enable the corresponding clamping arm to move along the second direction.

4. The precision clamping assembly as claimed in claim 3, wherein
    the body has two through slots formed in the chamber of the body along the first direction at a spaced interval, and each one of the two through slots communicates with the opening; and
    each one of the two clamping arms is disposed in one of the two through slots of the body.

5. The precision clamping assembly as claimed in claim 2, wherein
    the body has two through slots formed in the chamber of the body along the first direction at a spaced interval, and each one of the two through slots communicates with the opening; and
    each one of the two clamping arms is disposed in one of the two through slots of the body.

6. The precision clamping assembly as claimed in claim 5, wherein
    the body has two pivot holes formed in an inner wall of the body at a spaced interval and away from the opening, and each one of the two pivot holes communicates with one of the two through slots; and
    each pivot end of the two clamping arms is connected to one of the two pivot holes of the body to enable the clamping arm to pivot relative to the body.

7. The precision clamping assembly as claimed in claim 1, wherein the two driving elements of each one of the two driving sets are respectively a first driving element and a second driving element;
    the first driving element is disposed in the chamber of the body along the first direction, and abuts against one of the two clamping arms to enable the corresponding clamping arm to move along the third direction; and
    the second driving element is connected to one of the two clamping arms to enable the corresponding clamping arm to move along the second direction.

8. The precision clamping assembly as claimed in claim 7, wherein
    each one of the first driving elements and the second driving elements is made of a piezoelectric material;
    a voltage generated by the drive device after being energized enables each one of the first driving elements and the second driving elements to produce a mechanical deformation to enable the two clamping arms to move along the second direction and the third direction.

9. The precision clamping assembly as claimed in claim 8, wherein each clamping end of the two clamping arms is metal tweezers, the metal tweezers are combined with one of the second driving elements, and the two clamping arms clamp an object in a manner same as tweezers.

10. The precision clamping assembly as claimed in claim 9, wherein
    the body has two through slots formed in the chamber of the body along the first direction at a spaced interval, and each one of the two through slots communicates with the opening; and
    each one of the two clamping arms is disposed in one of the two through slots of the body.

11. The precision clamping assembly as claimed in claim 10, wherein
    the body has two pivot holes formed in an inner wall of the body at a spaced interval and away from the opening, and each one of the two pivot holes communicates with one of the two through slots; and
    each pivot end of the two clamping arms is connected to one of the two pivot holes of the body to enable the clamping arm to pivot relative to the body.

12. The precision clamping assembly as claimed in claim 8, wherein
    the body has two through slots formed in the chamber of the body along the first direction at a spaced interval, and each one of the two through slots communicates with the opening; and each one of the two clamping arms is disposed in one of the two through slots of the body.

13. The precision clamping assembly as claimed in claim 12, wherein
the body has two pivot holes formed in an inner wall of the body at a spaced interval and away from the opening, and each one of the two pivot holes communicates with one of the two through slots; and
each pivot end of the two clamping arms is connected to one of the two pivot holes of the body to enable the clamping arm to pivot relative to the body.

14. The precision clamping assembly as claimed in claim 7, wherein
the body has two through slots formed in the chamber of the body along the first direction at a spaced interval, and each one of the two through slots communicates with the opening; and
each one of the two clamping arms is disposed in one of the two through slots of the body.

15. The precision clamping assembly as claimed in claim 14, wherein
the body has two pivot holes formed in an inner wall of the body at a spaced interval and away from the opening, and each one of the two pivot holes communicates with one of the two through slots; and
each pivot end of the two clamping arms is connected to one of the two pivot holes of the body to enable the clamping arm to pivot relative to the body.

16. The precision clamping assembly as claimed in claim 1, wherein
the body has two through slots formed in the chamber of the body along the first direction at a spaced interval, and each one of the two through slots communicates with the opening; and
each one of the two clamping arms is disposed in one of the two through slots of the body.

17. The precision clamping assembly as claimed in claim 16, wherein
the body has two pivot holes formed in an inner wall of the body at a spaced interval and away from the opening, and each one of the two pivot holes communicates with one of the two through slots; and
each pivot end of the two clamping arms is connected to one of the two pivot holes of the body to enable the clamping arm to pivot relative to the body.

18. The precision clamping assembly as claimed in claim 17, wherein the third direction has two included angles respectively between the first direction and the second direction of the body.

19. The precision clamping assembly as claimed in claim 1, wherein the third direction has two included angles respectively between the first direction and the second direction of the body.

20. The precision clamping assembly as claimed in claim 1, wherein
the body has two pivot holes formed in an inner wall of the body at a spaced interval and away from the opening; and
each pivot end of the two clamping arms is connected to one of the two pivot holes of the body to enable the clamping arm to pivot relative to the body.

* * * * *